May 28, 1940.  F. K. GREEN  2,202,763
CONTROL FOR AIR CONDITIONING APPARATUS
Filed July 30, 1938  3 Sheets-Sheet 1
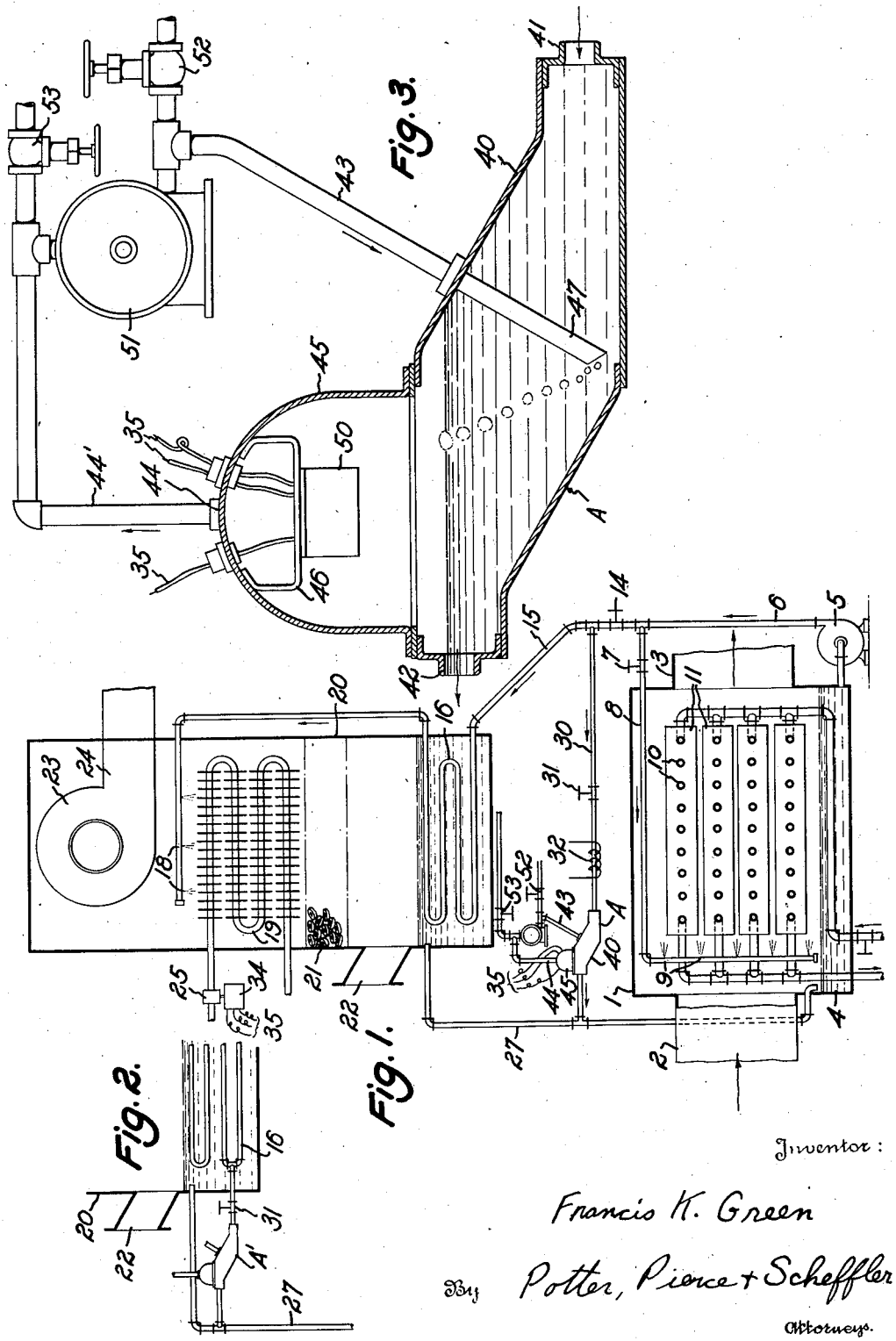
Inventor:
Francis K. Green
By Potter, Pierce + Scheffler
Attorneys.

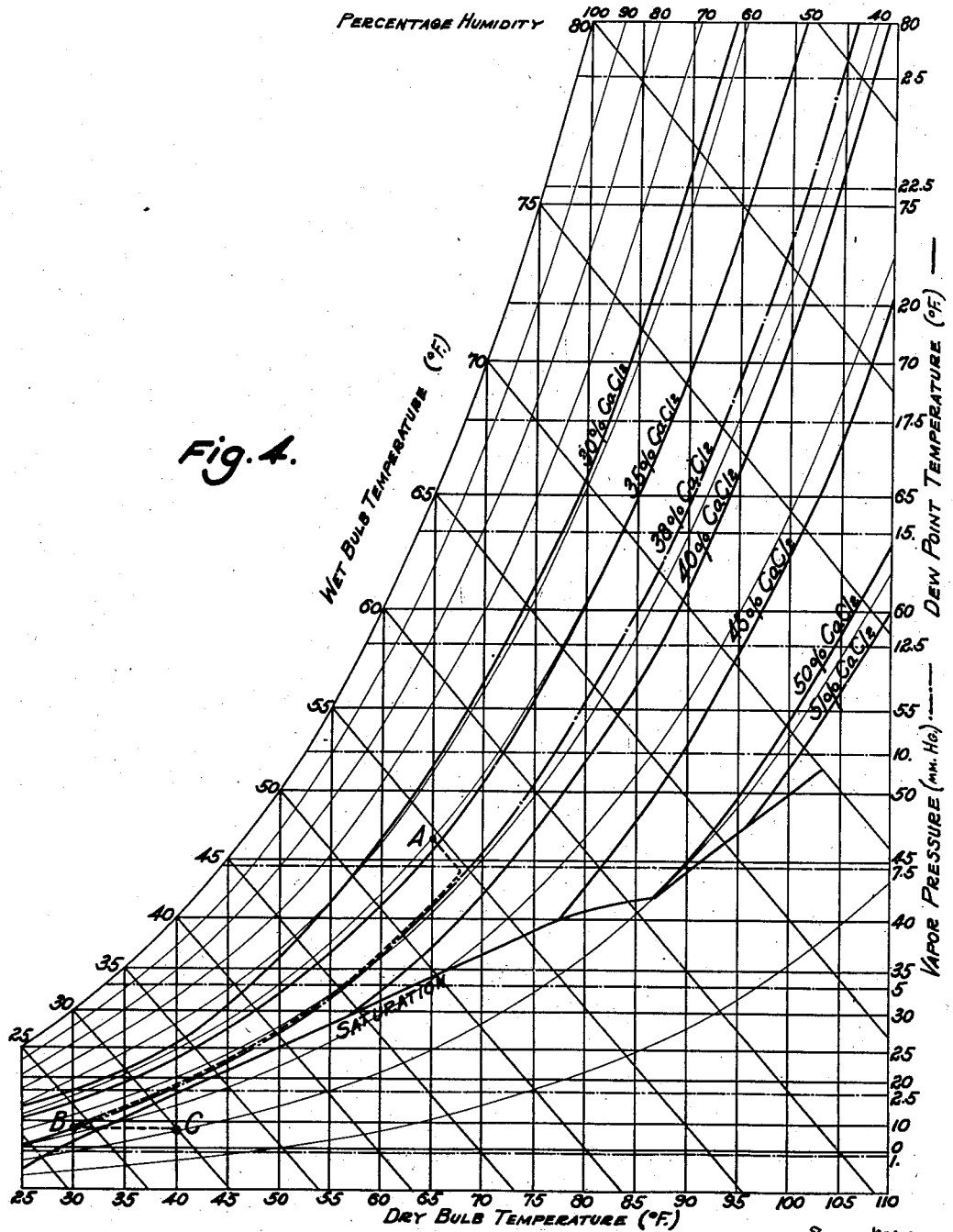

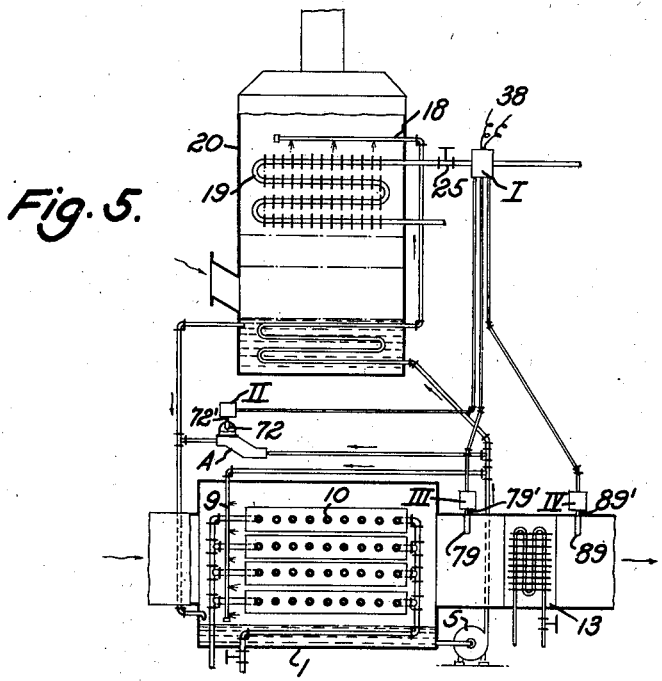

Patented May 28, 1940

2,202,763

UNITED STATES PATENT OFFICE 2,202,763

CONTROL FOR AIR CONDITIONING APPARATUS

Francis K. Green, Rahway, N. J., assignor to Research Corporation, New York, N. Y., a corporation of New York Application July 30, 1938, Serial No. 222,293

13 Claims. (Cl. 236—44)

This invention relates to the determination of the concentration of hygroscopic solutions and it is particularly directed to a method and means for controlling the concentration of such solutions in air conditioning apparatus used to impart to air predetermined humidity characteristics. The invention is pecularily useful for determining and controlling the humidity of air being conditioned at temperatures below the freezing point of water or with wet bulb temperatures below the freezing point. At these low temperatures, available methods and apparatus which depend upon the absorption of water, or upon the evaporation of water to influence temperature indicating means, for example, humidostats comprising wet bulb and dry bulb thermometers, do not give accurate, if any, values.

The invention utilizes the property of hygroscopic solutions, for example, calcium chloride brine, that the vapor pressures of the solutions vary with temperature at the same rate that the partial pressure of the water vapor in air will vary with temperature while the air is maintained at constant relative humidity. In other words, the vapor pressure of a solution and the partial pressure of the water vapor in air in contact with the solution will remain in equilibrium along some constant relative humidity line on the psychrometric chart as the solution and the air in contact therewith are varied in temperature. This means that at any temperature, in the common range of air conditioning, a measure of the relative humidity of the air in equilibrium with a hygroscopic solution is also a measure of the concentration of the solution; and, by maintaining the solution at constant concentration, air in contact and in thermal equilibrium with the solution will remain at the relative humidity which corresponds to that concentration, regardless of temperature at which equilibrium is established.

In the present invention, the hygroscopic solution used to adjust the relative humidity of a stream of air at low temperatures is tested for concentration by contacting it or a portion of it at a temperature above the freezing point of water, and preferably at a point in the temperature range where the particular measuring device used is most sensitive or accurate, contacting the heated solution with a, preferably circulating, body of air, and contacting this air, the aqueous partial pressure of which has been brought into equilibrium with the vapor pressure of the solution, with a humidity-sensitive device such as a humidostat. The relative humidity of the air in contact with the warm solution as measured by the humidostat is a measure of the concentration of the solution which in turn is a measure of the relative humidity of the main body of air which is being contacted by the solution. The two bodies of air both being contacted, in turn, by the same hygroscopic solution, even though at different temperatures, they have substantially the same relative humidity.

The principal object of the invention is to provide means whereby the relative humidity of an air stream which has been adjusted as to humidity by contacting the stream with a hygroscopic solution can be measured by measuring the relative humidity of a second stream of air which has been contacted by the solution.

A more particular object of the invention is to provide in a chemical absorption system used to adjust the humidity of air at temperatures below those at which available humidostats are operative, means for indirectly measuring the relative humidity of the air so adjusted as to humidity by contacting the solution at temperatures at which such humidostats are operative with a second stream of air.

Another object of this invention is to provide a novel method of conditioning air by contacting it with a body of hygroscopic liquid and thereafter heating the air to produce conditions of temperature and humidity unattainable by known methods of treating air with a hygroscopic liquid.

A further object of this invention is to provide a humidity measuring and/or control device for use in connection with the novel air conditioning method.

The invention will be more fully described with reference to the drawings in which:

Fig. 1 is a diagrammatic representation of a chemical absorption air conditioning system comprising the invention;

Fig. 2 is a fragmentary representation of a modification of the system shown in Fig. 1;

Fig. 3 shows, in elevation and partial section, means for measuring relative humidities in accordance with the invention;

Fig. 4 is a psychrometric chart having superimposed upon it vapor pressure and saturation curves for solutions of calcium chloride;

Fig. 5 is a diagrammatic representation of a modified air conditioning system incorporating additional features; and Fig. 6 is a diagrammatic sketch of a compensated Wheatstone bridge circuit for controlling or recording relative humidity.

In Fig. 1, the chamber designated by numeral 1 with inlet 2 and outlet 3 includes means for contacting air with a hygroscopic solution whereby the relative humidity of the air is adjusted to a desired value. The solution is removed from collecting basin 4 by pump 5 and forced through pipes 6 and 8 to spray nozzles 9, 9, the quantity pumped being regulated by valves 7 and 14. Nozzles 9 spray the solution over coils 10 with heat transfer fins 11 and from these coils the solution drops to basin 4. The hydroscopic solution absorbs water vapor from the air or gives up water vapor to the air depending upon the relative values of vapor pressure of the solution and partial pressure of the water vapor of the air. The latent heat associated with the water vapor is removed or supplied as sensible heat by the heat transfer fluid flowing in coils 10, the temperature of which fluid is regulated in accordance with the dry bulb temperature of the air leaving conditioning chamber 1, as by placing a thermostat in outlet 3 to control the temperature of the cooling fluid in coils 10. This temperature control system is described in detail in application Serial No. 121,663, of Stewart C. Coey, filed January 21, 1937.

As the solution changes in concentration while in contact with the air, part of the solution is continuously passed through pipe 15 to concentrator 20. Assuming that water has been absorbed by the solution in conditioner 1, this water must be removed in concentrator 20 and this is accomplished by heating the solution by passing it through coil 16 submerged in the hot solution in the bottom of concentrator 20, spraying it from nozzles 18 over steam coils 19 and blowing air through it as it falls over evaporative surface 21. The air for evaporation enters at inlet 22 and leaves through outlet 24, fan 23 being used to set up the air flow. The concentrated solution flows through pipe 27 to basin 4.

In copending application Serial No. 121,663 of Stewart C. Coey, an air conditioning system is described in which the concentration of the solution is controlled by means associated with a humidostat positioned in outlet 3 which regulates a valve on the steam supply, here indicated as valve 25 on the steam inlet to steam coils 19. When the temperature of the air leaving by outlet 3 is below 32 degrees F. most available types of humidostats do not respond to changes in relative humidity in reliable manner, and the wet and dry bulb type of humidostat will not function properly even if the dry bulb temperature of the air is above 32 degrees F. if the wet bulb temperature of the air is below 32 degrees F.

The present invention provides a control for such systems as the one described independent of the temperature of the air leaving the conditioner by measuring the dehumidifying property of the solution with another air stream. This is preferably done by diverting a portion of the stream of the solution circulated by pump 5 through pipe 30 and causing it to contact a stream of air flowing through tester A where the relative humidity of the air is determined by a humidostat in a manner which is readily understood by referring to the description of Fig. 3. If the temperature of the solution passing through pipe 30 is too low for satisfactory operation of the humidostat in tester A it is warmed, for instance, by an electric heater indicated by resistance coil 32, before it enters tester A. Coil 32 can be automatically regulated to keep the solution entering tester A at constant temperature, but this is not necessary. It is desirable to maintain a low pressure in tester A and valve 31 (an orifice control will do) is used to reduce the pressure of the solution as it approaches tester A. The pressure in tester A is held just slightly above the pressure in return pipe 27 into which the solution from the tester flows. Electric impulses from the humidity-sensitive device in tester A are transmitted to modulating means 34 on valve 25 for control thereof by wires 35.

An alternate position for tester A is shown at A' in Fig. 2, wherein the by-passed solution is removed from heat exchanger coils 16 after the solution has warmed up in the coil to a satisfactory temperature.

Tester A, shown in detail in Fig. 3, comprises a container 40 with solution inlet 41 and solution outlet 42, air inlet 43, air dome 45 with outlet 44, and a humidostat 50 suspended in the air dome by support 46. An air pump 51, which may be mounted directly on container 40, is used to force air through the solution. The air is liberated under the surface of the solution at pipe end 47 and after passing upwards through the solution is collected in air dome 45 where it passes over and around humidostat 50 to reach outlet 44.

The air must contact the solution in tester A intimately enough and for a long enough time to have its aqueous partial pressure reach substantially the same value as the vapor pressure of the solution. If the air entering 43 has a partial vapor pressure and temperature very close to that of the solution, equilibrium is quickly reached. To obtain such conditions, it is desirable to recirculate the same air instead of bringing in all new air which might have characteristics quite at variance with the air after contact. The relative amounts of air and solution brought into contact in tester A should be such that the concentration of the solution is not substantially altered in passing through the tester. Air leaving the tester by outlet 44 is returned to the pump by pipe 44' and thence to the tester by pipe 43. In order that gases other than air, which might be given up by the solution, do not concentrate in the circulating air stream, some of the air is continuously bled off through valve 52 and new air is drawn in through valve 53.

Tester A may be utilized to measure the concentration of the brine issuing from the sump of the concentrator 20 to be returned to conditioning chamber 1, the temperature of which brine may be above the temperature of most satisfactory operation of the humidostat used. To accomplish this, a portion of the hot concentrated solution running in pipe 27 is by-passed through tester A and returned to the pipe after passing through the tester. Before entering the tester, the solution is cooled to a suitable temperature by immersing the pipe leading the solution to the tester in a bath of cold water, or by any other suitable cooling means. In this alternate set-up, the position of the tester, as shown in Fig. 1, is modified in accordance with this description.

Utilizing the above-described invention, it is possible to control closely the dehumidification of air at wet bulb temperatures below 32 degrees F. Also it is possible to obtain relative humidities of air lower than the value corresponding to the vapor pressure of a given hygroscopic liquid at a given temperature.

A method of conditioning air has been devised, which comprises cooling the air to a temperature lower than the desired temperature in contact with a hygroscopic solution not saturated at said lower temperature, and having a concentration such that the dew point of the air in equilibrium therewith is the same as the dew point of the air under the desired conditions, and thereafter warming the air to the desired temperature out of contact with the hygroscopic solution.

Suppose, for example, it is desired to cool and dehumidify air at 65 degrees F. dry bulb and 50% relative humidity, indicated at point A in Fig. 4, to 40 degrees F. dry bulb and 20% relative humidity, indicated at point C in Fig. 4, using $CaCl_2$ brine. Referring to Fig. 4, it is seen that the vapor pressure line for approximately 38% $CaCl_2$ brine intersects the 30 degrees F. dry bulb line at 30% relative humidity, and air in contact with 38% $CaCl_2$ brine has a relative humidity of 30% at a dry bulb temperature of 30 degrees F.

It is not possible to obtain air in the physical state indicated at C in contact with $CaCl_2$ brine, because the vapor pressure of a saturated solution of $CaCl_2$ brine at the desired temperature is higher than the partial pressure of water vapor desired in the air, and the use of supersaturated solutions is not feasible. However, air at 30° F. and 30% relative humidity, indicated at B in Fig. 4, is obtained by treating air with the given 38% $CaCl_2$ brine at 30° F. The air so treated is withdrawn from contact with the conditioning brine and heated to 40° F. dry bulb at constant dew point to obtain air in the desired state, i. e., 40° F. dry bulb and 20% relative humidity.

It is to be noted that the dry bulb temperature at B and the wet bulb temperature at both B and C are below the freezing point of water, 32° F., and that ordinary humidostats are not suitable instruments for measuring or controlling the degree of humidification at these low temperatures.

The improved humidity controlling system of the invention, however, may be used in combination with an air conditioning apparatus, as shown in Fig. 5, to condition air to a relative humidity lower than the equilibrium value of air in contact with a given hygroscopic liquid.

The apparatus of Fig. 5 is similar to that shown in Fig. 1, but includes in addition a heating coil 13, or similar dry-heating means, positioned in the air duct 3 in the stream of air leaving the conditioning chamber 1. The temperature of the heating coil may be automatically regulated in accordance with the air temperature required by utilizing a suitable thermo-sensitive regulator placed to contact air leaving the heating coil. This temperature control is similar to that described in connection with the control of liquid temperature in cooling coil 10.

To obtain air in the state C from air in the state A, using 38% $CaCl_2$ brine in the modified apparatus described above, such air is contacted in the chamber 1 with 38% $CaCl_2$ brine maintained at 30° F. Air leaving the chamber 1 and entering duct 3 has a relative humidity of 30% and a dry bulb temperature of 30° F. In the duct 3, this air is warmed to 40° F., without adding additional moisture, by the heating coil 13 which preferably contains water at slightly above 40° F. After passing over the coil, the air has a dry bulb temperature of 40° F. and a relative humidity of 20%. The air is thus adjusted to the state required and is led to the space to be conditioned.

The saturation line for $CaCl_2$ brine passes between the points B and C in Fig. 4. C then represents a state physically impossible to attain by contacting air with a solution of the given salt, for there is no solution of the salt which will be in equilibrium with air under the conditions indicated at C, because minimum vapor pressures for solutions of $CaCl_2$ brine fall on the saturation curve.

It is thus possible to utilize hygroscopic solutions for the treatment of air to obtain conditions of temperature and humidity which could not be realized by the heretofore known methods of contacting air with hygroscopic solutions.

There is thus provided a method of adjusting the temperature and humidity content of air by cooling it in contact with a solution of hygroscopic substance, a saturated solution of which has a vapor pressure greater than the desired partial pressure of water vapor in the air at the desired temperature, which comprises cooling the air in contact with a non-saturated solution of said hygroscopic substance to a temperature, at which the air in equilibrium with said solution has a dew point equal to the dew point of air under the desired conditions, and thereafter warming the air to the desired temperature out of contact with said solution.

It is stated in the above description of the invention that, if the hygroscopic solution is maintained at constant concentration, air in contact with the solution will remain at constant relative humidity, regardless of the temperature. This is correct to the degree required for most practical purposes, but those familiar with the characteristics of solutions of the type mentioned realize that slight deviations from this relationship do exist and recognition of these deviations is necessary where the temperature is to be changed substantially. From Fig. 4 it may be seen that the vapor pressure lines for $CaCl_2$ brine do not exactly coincide with the constant relative humidity lines, and this deviation accounts for differences in vapor equilibrium values of air in contact with brine at different temperatures.

Also when air is heated at constant dew point, the relative humidity is lowered and this lowering is a function of the change in temperature.

To obtain a true value of the relative humidity of air leaving the heating coil 13, it is necessary to modify the value indicated by the humidostat in the tester A by two factors. The first factor is a function of the temperature difference between that part of the solution in contact with the air being conditioned and that part of the solution being by-passed into tester A, and is attributable to the non-parallel relationship between constant relative humidity lines and vapor pressure lines for hygroscopic solutions of constant composition. The second factor is a function of the temperature difference between the air in contact with the hygroscopic solution in chamber 1 and the air leaving heater 13.

Fig. 6 is a diagrammatic representation of a compensated instrument which will take into account these factors. I is a motor unit consisting of reversible motor 85 with rotor 64, field windings 65, 65' and reversing switch 60. Balancing relays 62 and 63 actuate switch 60 to cause the motor to rotate in one direction or the other, depending upon which of the relays is carrying the higher current, and to stop the motor when the relays are balanced. 67 is a potentiometer placed across the power lines 38, and sliding contact 66, which is attached to motor shaft 61, rotates with the motor in a direction to compensate for any unbalanced condition of relays 62 and 63 to restore the balance therebetween, and to shut off the motor. Shaft 61, in addition to actuating contact 66, also may carry a hand which reads on a scale graduated in terms of relative humidity or it may influence a mechanism for continuously recording the relative humidity. Alternatively, or additionally, it may actuate a control mechanism to vary the concentration of the hygroscopic liquid.

II represents a humidity controller. 71 is a potentiometer provided with sliding contact 84 which is actuated by humidity-sensitive element 72, placed in the air dome of tester A, through linkage 72'. Changes in humidity of the air being tested cause corresponding fluctuations in the position of contact 84 against the resistance in the potentiometer and result in the unbalancing of relays 62 and 63, which causes motor 60 to turn in a direction to counteract this unbalanced condition by changing the position of contact 66 in potentiometer 67. When balance is attained, switch 60 returns to open position, and motor 85 stops.

The relative humidity of the air in equilibrium with the solution in tester A is substantially the same as the relative humidity of the air leaving conditioner 1. However, slight differences do exist because of the difference in temperature between the sample of liquid being tested and the main body of the liquid in contact with the air being conditioned. To compensate for this slight variation, which is a function of the difference in temperature between the air in the tester and the air in the conditioning chamber, element 79 sensitive to the dry bulb temperature of the air is placed in air duct 3, Fig. 5, between conditioner 1 and heater 13. This temperature-sensitive element, by means of linkage 79', actuates the sliding contact 86 in potentiometer 78 of temperature compensator III, which is connected in parallel with potentiometer 71. Changes in dry bulb temperature of the air leaving conditioner 1 move contact 86 to unbalance relays 62 and 63 and to cause the motor to turn in a direction to rebalance the circuit. The direction of this compensating movement is such that contact 66 in potentiometer 67 moves an indicating hand to give a reading on a relative humidity scale in accordance with the actual variation in relative humidity of the air in duct 3 leaving conditioner 1. In order that changes in dry bulb temperature of the air leaving the conditioning chamber, caused by changes in the temperature of the hygroscopic solution therein, may be used to compensate for corresponding changes in relative humidity, it is necessary to keep the temperature of the solution in tester A at a constant value, so that fluctuations in the position of element 79 will be proportional to the temperature difference between the two portions of the solution.

Temperature compensator IV comprises a potentiometer 87, like potentiometer 78, provided with sliding contact 88, which, by means of linkage 89', is actuated by an element 89 sensitive to the dry bulb temperature of the air leaving heater 13. This potentiometer is connected in parallel with potentiometer 71 and acts in accordance with the dry bulb temperature of the air leaving heater 13 to cause a movement of the indicator connected to motor shaft 61 as the bridge is balanced, which movement is in a direction to indicate actual changes in relative humidity due to iso-dew point temperature variation of the air effected by heater 13. Since the temperature of the air in conditioning chamber 1 is kept constant within a few degrees, variations in the dry bulb temperature of the air leaving the heating coil are a function of the difference between this temperature and the temperature in the conditioning chamber.

Rheostats 68, 69 and 70 are placed in the circuit of Fig. 6 for manually adjusting the balance thereof so that the instrument may be used as an indicator or controller under widely varying conditions of temperature and humidity. Rheostat 68 is adjusted so that the relative humidity of the air in contact with the humidity-sensitive element in tester A is indicated. Rheostat 69 is then adjusted to give a true reading of the relative humidity of the air leaving chamber 1. Finally, rheostat 70 is adjusted so that the relative humidity of air leaving heater 13 is indicated. Once set in this manner, the automatic features of the instrument operate to indicate the instantaneous relative humidity of air leaving heater 13 over a wide range of relative humidity and dry bulb temperature.

The instrument of Fig. 6 may be used to control the concentration of the hygroscopic solution in accordance with the relative humidity of air leaving heating coil 13 by providing means for regulating the admission of steam to the concentrator 20, such as valve 25 which may be opened or closed as called for by changes in relative humidity indicated by the instrument.

The Wheatstone bridge indicator comprising motor unit I and humidity controller II would give an accurate measurement of the relative humidity of the air leaving the conditioning chamber were it not for the difference in temperature between the sample of hygroscopic solution tested and the hygroscopic solution in contact with the air being conditioned. Temperature compensator III is thrown across the circuit to modify the indicated relative humidity, as the relative humidity of the air treated varies slightly with changes in temperature of the hygroscopic solution. Temperature compensator IV modifies the indicated relative humidity in accordance with the actual change thereof as the temperature of the air is varied at constant dew point. These compensators permit the instrument to give a true reading of the relative humidity of the air leaving heating coil 13 on its way to the space to be conditioned.

The arrangement of the elements of the system may be widely varied without departing from the principles of the invention which comprise the determination and control of the relative humidity of a stream of air in contact with a hygroscopic solution by withdrawing a portion of the solution, contacting it at a temperature above the freezing point of water with a second stream of air in an amount insufficient to alter substantially the concentration of the solution and thereafter contacting the second air stream with a humidityl-sensitive device.

I claim:

1. A method for the determination of the relative humidity of a stream of air in contact with a hygroscopic solution and having a wet bulb temperature below the freezing point of water which comprises withdrawing a portion of the solution and contacting it with a second stream of air in an amount insufficient to alter substantially the concentration of the solution until substantial aqueous vapor pressure equilibrium is obtained between said second stream of air and said solution at a temperature such that the wet bulb temperature of the second stream of air after said contact is above the freezing point of water, and thereafter determining the relative humidity of the second stream of air.

2. A method as defined in claim 1 wherein the hygroscopic solution is heated before contact with the second stream of air to a temperature within the range of maximum sensitivity of a humidity-sensitive device.

3. A method for controlling the concentration of a hygroscopic solution which is circulated in contact with a stream of air for the adjustment of the relative humidity of said stream of air at a wet bulb temperature below the freezing point of water, which comprises circulating a portion of said hygroscopic solution in contact with a second stream of air in amount insufficient to alter substantially the concentration of the solution until substantial aqueous vapor pressure equilibrium is obtained between said second stream of air and said solution at a temperature such that the wet bulb temperature of the second stream of air after said contact is above the freezing point or water, circulating a further portion of said solution through a concentrating zone, and controlling the removal of water from said solution in the concentrating zone in response to the relative humidity of said second stream of air after contact with said solution.

4. Apparatus for determining the relative humidity of a stream of air in contact with a hygroscopic solution, comprising means for flowing a portion of said hygroscopic solution through a chamber, means for passing a second stream of air into intimate contact with said solution in said chamber, and a humidity-sensitive element in contact with said second stream of air after it has been contacted with said solution.

5. Apparatus for determining the relative humidity of a stream of air in contact with a hygroscopic solution, comprising means for heating a portion of said hygroscopic solution, means for flowing said heated portion of hygroscopic solution through a chamber, means for passing a second stream of air into intimate contact with said solution in said chamber, and a humidity-sensitive element in contact with said second stream of air after it has been contacted with said solution.

6. In combination with apparatus for adjusting the relative humidity of a stream of air by contacting it with a hygroscopic solution, means for concentrating said solution, means for flowing a portion of said hygroscopic solution through a chamber, means for passing a second stream of air into intimate contact with said solution in said chamber, a humidity-sensitive element in contact with said second stream of air after it has been contacted with said solution, and means responsive to said humidity-sensitive element for controlling said concentrating means.

7. In combination with apparatus for adjusting the relative humidity of a stream of air by contacting it with a hygroscopic solution, means for concentrating said solution, means for heating a portion of said hygroscopic solution, means for flowing said heated portion of hygroscopic solution through a chamber, means for passing a second stream of air into intimate contact with said solution in said chamber, a humidity-sensitive element in contact with said second stream of air after it has been contacted with said solution, and means responsive to said humidity-sensitive element for controlling said concentrating means.

8. A method for the determination of the relative humidity of a stream of air in contact with a hygroscopic solution and having a wet bulb temperature below the freezing point of water which comprises determining the relative humidity of a second stream of air which has been brought into substantial aqueous vapor pressure equilibrium with said hygroscopic solution at a temperature such that the wet bulb temperature of the second stream of air is above the freezing point of water.

9. In combination with apparatus for adjusting the relative humidity of a stream of air by contacting it with a hygroscopic solution, means for flowing a portion of said hygroscopic solution through a chamber; means for passing a second stream of air into intimate contact with said solution in said chamber, a humidity-sensitive element in contact with said second stream of air, control-effectuating mechanism actuated by said humidity-sensitive element, a temperature-sensitive element in contact with said first stream of air after it has been contacted with said solution, and means responsive to said temperature-sensitive element for modulating the actuation of said control-effectuating mechanism in response to variations in the dry bulb temperature of said first stream of air.

10. In combination with apparatus for adjusting the relative humidity of a stream of air by contacting it with a hygroscopic solution, means for flowing a portion of said hygroscopic solution through a chamber; means for passing a second stream of air into intimate contact with said solution in said chamber, a humidity-sensitive element in contact with said second stream of air, control-effectuating mechanism actuated by said humidity-sensitive element, a temperature-sensitive element in contact with said first stream of air after it has been contacted with said solution, means responsive to said temperature-sensitive element for modulating the actuation of said control-effectuating mechanism in response to variations in the dry bulb temperature of said first stream of air, means for heating said first stream of air after it has been contacted with said solution, a temperature-sensitive element in contact with said heated air, and means responsive to said temperature-sensitive device for further modulating the actuation of said control-effectuating mechanism in response to variations in the dry bulb temperature of said heated air.

11. A method for the determination of the relative humidity of a stream of air in contact with a hygroscopic solution and having a wet bulb temperature below the freezing point of water which comprises determining the relative humidity of a second stream of air which has been brought into substantial aqueous vapor pressure equilibrium with said hygroscopic solution at a temperature such that the wet bulb temperature of the second stream of air is above the freezing point of water and modulating said relative humidity determination in a predetermined manner in response to the temperature of the air leaving the hygroscopic solution at the lower temperature, whereby to correct the relative humidity determination for such temperature.

12. A method for the determination of the relative humidity of a stream of air in contact with a hygroscopic solution and having a wet bulb temperature below the freezing point of water which comprises determining the relative humidity of a second stream of air which has been brought into substantial aqueous vapor pressure equilibrium with said hygroscopic solution at a temperature such that the wet bulb temperature of the second stream of air is above the freezing point of water, maintaining the temperature at which said relative humidity determination is effected substantially constant, determining the temperature of the air leaving the hygroscopic solution at the lower temperature, and modulating the relative humidity determination in a predetermined manner in response to variations in said latter temperature.

13. A method of controlling the operation of apparatus for adjusting the relative humidity of a stream of air by contacting it with a hygroscopic solution, which comprises determining the relative humidity of a second stream of air which has been brought into substantial aqueous vapor pressure equilibrium with said hygroscopic solution at a substantially constant temperature above the temperature of the hygroscopic solution at said first contact and such that the wet bulb temperature of the second stream of air is above the freezing point of water, determining the dry bulb temperature of the air leaving said first contact, modulating said relative humidity determination in response to said dry bulb temperature determination, and controlling the operation of said apparatus in response to variations in said modulated relative humidity determination.

FRANCIS K. GREEN.